US012812474B2

(12) United States Patent
Ishii et al.

(10) Patent No.: US 12,812,474 B2
(45) Date of Patent: Nov. 24, 2026

(54) COMMUNICATION APPARATUS

(71) Applicant: CANON KABUSHIKI KAISHA, Tokyo (JP)

(72) Inventors: Takafumi Ishii, Kanagawa (JP); Keigo Tsuchiya, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 258 days.

(21) Appl. No.: 18/604,270

(22) Filed: Mar. 13, 2024

(65) Prior Publication Data

US 2024/0323766 A1 Sep. 26, 2024

(30) Foreign Application Priority Data

Mar. 22, 2023 (JP) ................................ 2023-044872

(51) Int. Cl.

*H04W 72/0453* (2023.01)
*H04L 5/00* (2006.01)
*H04W 28/18* (2009.01)

(52) U.S. Cl.

CPC .......... *H04W 28/18* (2013.01); *H04L 5/0048* (2013.01); *H04W 72/0453* (2013.01)

(58) Field of Classification Search

None
See application file for complete search history.

(56) References Cited

U.S. PATENT DOCUMENTS

2016/0353485 A1* 12/2016 Wentink ................ H04W 74/04
2018/0035438 A1* 2/2018 Pao ........................ H04W 72/21
2023/0362711 A1* 11/2023 Bang ..................... H04W 12/50
2023/0403726 A1* 12/2023 Shanmugam ....... H04W 72/121
2024/0276525 A1* 8/2024 Chun .................... H04W 84/20

FOREIGN PATENT DOCUMENTS

JP 2012019487 A 1/2012

* cited by examiner

*Primary Examiner* — Robert M Morlan
(74) *Attorney, Agent, or Firm* — Canon U.S.A., Inc. IP Division

(57) ABSTRACT

A communication apparatus, operating as a master station that determines a communication channel to be used in wireless communication, transmits a second trigger frame, which is compliant with the Institute of Electrical and Electronics Engineers (IEEE) 802.11 standard and includes information indicating that carrier sense is not to be executed, to a slave station apparatus connected to the master station.

12 Claims, 10 Drawing Sheets

COMMUNICATION APPARATUS

BACKGROUND

Field of the Disclosure

The present disclosure relates to a communication apparatus.

Description of the Related Art

Japanese Patent Application Laid-Open No. 2012-19487 discusses a technique in which an image forming apparatus can perform wireless communication in an infrastructure mode and wireless communication in an ad hoc mode in parallel via an access point.

In recent years, wireless communication has been used in various cases, and the provision of convenient wireless communication is desired.

SUMMARY

According to an aspect of the present disclosure, a communication apparatus configured to perform first wireless communication via an external access point and second wireless communication not via an external access point includes at least one memory and at least one processor and/or at least one circuit which function as a first reception unit configured to, in a case where a wireless setting mode is enabled, receive information regarding an external access point from a terminal apparatus through a direct connection established between the communication apparatus and the terminal apparatus not via an external access point outside the communication apparatus, a second reception unit configured to, based on the information regarding the external access point received by the first reception unit, connect to an external access point and receive a first trigger frame compliant with the Institute of Electrical and Electronics Engineers (IEEE) 802.11 standard from the external access point, the first trigger frame including information regarding execution of carrier sense, a first transmission unit configured to, in a case where the first trigger frame includes information indicating that the carrier sense is to be executed, execute the carrier sense and then transmit data, and a second transmission unit configured to, in a case where the communication apparatus operates as a master station that is configured to determine a communication channel to be used in the second wireless communication, transmit a second trigger frame compliant with the IEEE 802.11 standard to a slave station apparatus connected to the master station, the second trigger frame including information indicating that the carrier sense is to be executed.

Further features of the present disclosure will become apparent from the following description of embodiments with reference to the attached drawings.

DESCRIPTION OF THE EMBODIMENTS

An embodiment of the present disclosure will be described in detail below with reference to the drawings. The embodiment is merely an example, and specific examples of components, processing steps, and display screens described in the embodiment are not intended to limit the scope of the present disclosure unless otherwise specified.

<System Configuration>

Figure 1:
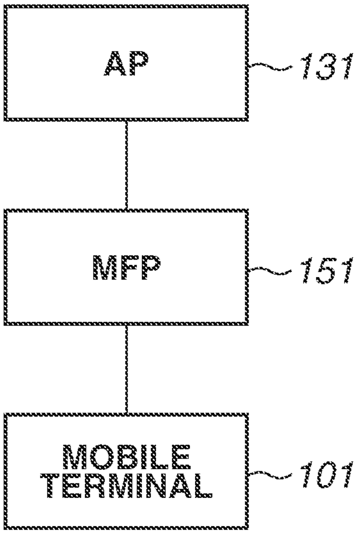
FIG. 1 is a diagram illustrating an example of a configuration of a system according to an embodiment.

FIG. 1 illustrates an example of a configuration of a system according to an embodiment of the present disclosure. The system is an example of a wireless communication system where a plurality of communication apparatuses can wirelessly communicate with each other. In the example of FIG. 1, the system includes an access point 131, a multi-function peripheral (MFP) 151, and a mobile terminal 101. The mobile terminal 101 is an example of a mobile terminal and is a laptop personal computer or a smartphone.

The MFP 151 has a printing function, a reading function (a scanner function), and a facsimile function. The MFP 151 according to the present embodiment also has a communication function capable of wirelessly communicating with the mobile terminal 101. While a case where the MFP 151 is used as an image forming apparatus is described in the present embodiment, the present embodiment is not limited thereto. For example, a facsimile apparatus, a scanner apparatus, a projector, or a single-function printing apparatus may be used instead of the MFP 151. In the present embodiment, an apparatus having a printing function is also referred to as an image forming apparatus (or a communication apparatus).

The access point 131 is provided separately from (outside) the mobile terminal 101 and the MFP 151, and operates as a base station apparatus in a wireless local area network (WLAN). The access point 131 is also referred to as the external access point 131 or the external wireless base station (or the external master station). The MFP 151 having a WLAN communication function can perform communication in a WLAN infrastructure mode via the access point 131. Hereinafter, an access point is also referred to as an "AP". The infrastructure mode is also referred to as the "wireless infrastructure mode".

The infrastructure mode is a mode in which the MFP 151 communicates with another apparatus via an external apparatus (e.g., the access point 131) forming a network. A connection to the external access point 131 established by the MFP 151 operating in the infrastructure mode is referred to as an infrastructure connection. In the present embodiment, in the infrastructure connection, the MFP 151 operates as a slave station, and the external access point 131 operates as a master station. In the present embodiment, the master station refers to an apparatus that determines a communication channel to be used in a network to which the master station belongs, and the slave station refers to an apparatus that does not determine a communication channel to be used in a network to which the slave station belongs, and uses the communication channel determined by the master station.

The access point 131 wirelessly communicates with a communication apparatus (an authenticated communication apparatus) permitted to connect to the access point 131, and relays wireless communication between the communication apparatus and another communication apparatus. The access point 131 can also be connected to, for example, a wired communication network and can relay communication between a communication apparatus connected to the wired communication network and another communication apparatus wirelessly connected to the access point 131.

The mobile terminal 101 and the MFP 151 can wirelessly communicate with each other in the wireless infrastructure mode via the external access point 131 or in a peer-to-peer mode not via the external access point 131, using respective WLAN communication functions of the mobile terminal 101 and the MFP 151. Hereinafter, peer-to-peer is referred to as "P2P". Communication not performed via the external access point 131 is also referred to as direct wireless communication. The P2P mode includes Wi-Fi Direct® and a software AP mode. The P2P mode can also be compliant with the Institute of Electrical and Electronics Engineers (IEEE) 802.11 series.

The P2P mode refers to a mode in which the MFP 151 directly communicates with another apparatus such as the mobile terminal 101. That is, the communication is not performed via an external apparatus that forms a network. In the present embodiment, the P2P mode includes an AP mode where the MFP 151 operates as an access point. Connection information (a Service Set Identifier (SSID) and a password) relating to the access point enabled in the MFP 151 in the AP mode can be optionally set by a user. The P2P mode may include, for example, a Wi-Fi Direct® mode for the MFP 151 to communicate using Wi-Fi Direct®. Which of Wi-Fi Direct®-compatible devices is to operate as the master station is determined, for example, according to a sequence termed "group owner negotiation". Alternatively, the master station may be determined without executing the group owner negotiation. An apparatus that is a Wi-Fi Direct®-compatible device and serves as the master station is particularly referred to as a group owner. A connection to another apparatus established by the MFP 151 operating in the P2P mode is referred to as a direct connection. In the present embodiment, in the direct connection, the MFP 151 operates as the master station, and another apparatus (e.g., the mobile terminal 101) operates as the slave station.

Figure 2A:
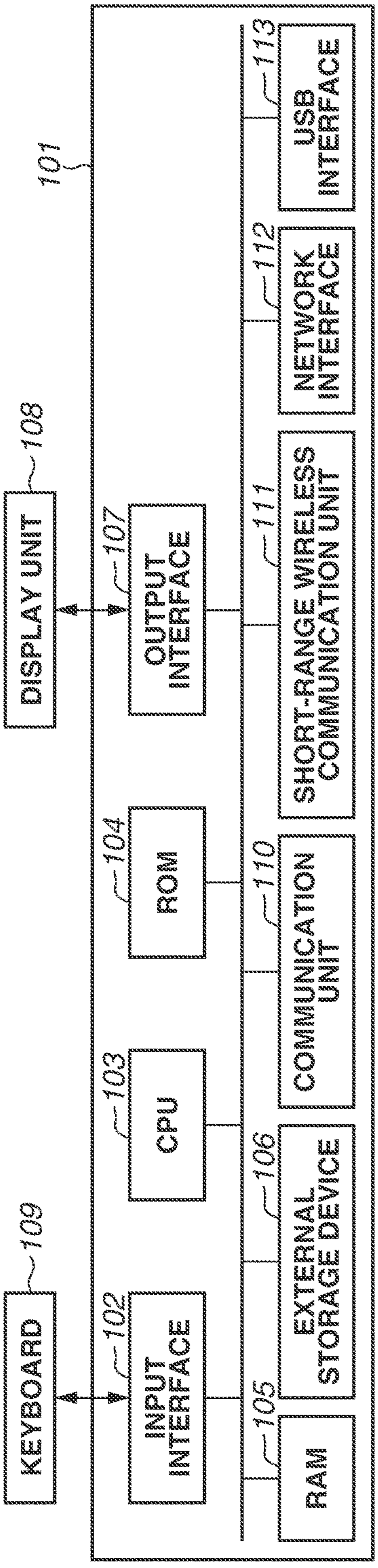
FIG. 2A is a block diagram illustrating an example of a hardware configuration of a mobile terminal.
Figure 2B:
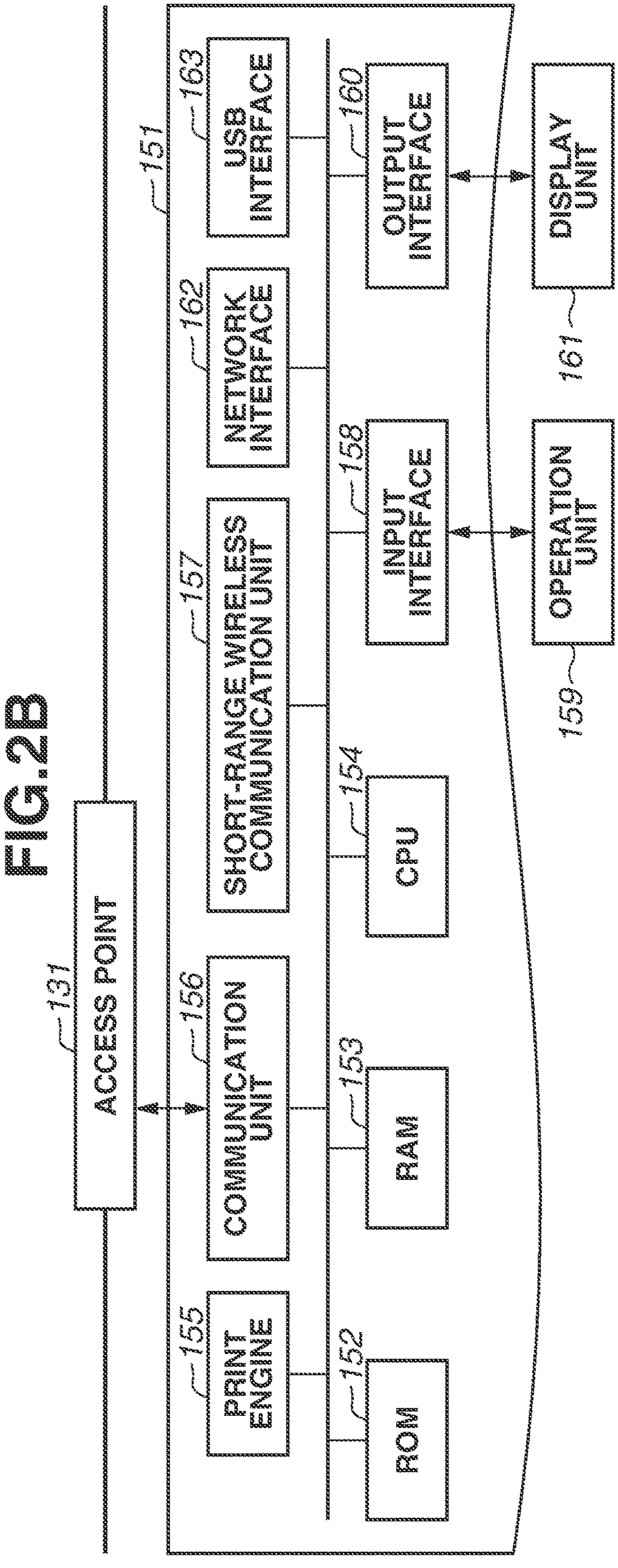
FIG. 2B is a block diagram illustrating an example of a hardware configuration of an image forming apparatus.

Next, a description will be given of a configuration of the mobile terminal 101 according to the present embodiment and a configuration of the communication apparatus (the MFP 151) capable of communicating with the mobile terminal 101 according to the present embodiment with reference to FIGS. 2A and 2B, respectively. While the present embodiment is described taking the following configurations as examples, the present embodiment is applicable to any apparatus capable of communicating with a communication apparatus, and the functions are not particularly limited to those illustrated in FIGS. 2A and 2B.

The mobile terminal 101 includes an input interface 102, a central processing unit (CPU) 103, a read-only memory (ROM) 104, a random-access memory (RAM) 105, an external storage device 106, an output interface 107, a display unit 108, a keyboard 109, a communication unit 110, a short-range wireless communication unit 111, a network interface 112, and a Universal Serial Bus (USB) interface 113. The CPU 103, the ROM 104, and the RAM 105 form a computer of the mobile terminal 101.

The input interface 102 receives input data or an operation instruction from the user operating an operation unit such as the keyboard 109. The operation unit may be a physical keyboard or physical buttons, or may be a software keyboard or software buttons displayed on the display unit 108. In other words, the input interface 102 may receive an input (an operation) from the user through the display unit 108.

The CPU 103 is a system control unit and controls the entire mobile terminal 101. The ROM 104 stores fixed data such as control programs to be executed by the CPU 103, a data table, and an embedded operating system (hereinafter referred to as an embedded OS). In the present embodiment, the control programs stored in the ROM 104 perform software execution control such as scheduling, task switching, and interrupt processing under control of the embedded OS stored in the ROM 104.

The RAM 105 includes a static random-access memory (SRAM) using a backup power supply. In the RAM 105, data is held by a primary battery (not illustrated) for data backup. Thus, the RAM 105 can store important data such as a program control variable without volatilizing the data. A memory area for storing setting information regarding the mobile terminal 101 and management data on the mobile terminal 101 is also provided in the RAM 105. The RAM 105 is also used as a main memory or a work memory of the CPU 103.

The external storage device 106 stores a print information generation program for generating print information that can be interpreted by the MFP 151. The output interface 107 controls the display unit 108 to display data or provide a notification of the state of the mobile terminal 101.

The display unit 108 includes a light-emitting diode (LED) or a liquid crystal display (LCD). The display unit 108 displays data or provides a notification of the state of the mobile terminal 101. The communication unit 110 is configured to connect to an apparatus such as the MFP 151 or the access point (AP) 131 to perform data communication. For example, the communication unit 110 is connectable to the access point (not illustrated) in the MFP 151. The communication unit 110 and the access point in the MFP 151 are connected to each other, whereby the mobile terminal 101 and the MFP 151 can perform P2P communication therebetween. The communication unit 110 may directly communicate with the MFP 151 through wireless communication, or may communicate with the MFP 151 via an external apparatus outside the mobile terminal 101 and the MFP 151. Examples of the external apparatus include an external access point (e.g., the access point 131) outside the mobile terminal 101 and the MFP 151, and an apparatus, other than an access point, capable of relaying communication. In the present embodiment, the wireless communication method used by the communication unit 110 is Wireless Fidelity (Wi-Fi®) which is a communication standard compliant with the IEEE 802.11 series. Examples of the access point 131 include a device such as a WLAN router.

The short-range wireless communication unit 111 is configured to wirelessly connect to an apparatus such as the MFP 151 over a short range to perform data communication. The short-range wireless communication unit 111 performs communication using a communication method different from that of the communication unit 110.

The short-range wireless communication unit 111 is connectable to, for example, a short-range wireless communication unit 157 in the MFP 151. Examples of the communication method include near-field communication (NFC), Bluetooth® Classic, Bluetooth® Low Energy, and Wi-Fi Aware®.

The network interface 112 is a connection interface (I/F) that controls wireless communication and communication processing via a wired LAN cable.

The USB interface 113 is a connection I/F that controls a USB connection via a USB cable. More specifically, the USB interface 113 connects to an apparatus such as the MFP 151 or the external access point 131 via a USB cable to perform data communication.

Next, the MFP 151 will be described in relation to FIG. 2B. The MFP 151 includes a ROM 152, a RAM 153, a CPU 154, a print engine 155, a communication unit 156, the short-range wireless communication unit 157, an input interface 158, an operation unit 159, an output interface 160, a display unit 161, a network interface 162, and a USB interface 163. The ROM 152, the RAM 153, and the CPU 154 form a computer of the MFP 151.

The communication unit 156 controls communication processing using the respective interfaces. For example, the MFP 151 can operate in the infrastructure mode and the P2P mode which are communication modes using the communication unit 156.

More specifically, the communication unit 156 can operate as an internal access point inside the MFP 151. For example, the user instructs the MFP 151 to enable the internal access point, whereby the MFP 151 operates as an access point. In the present embodiment, the wireless communication method used by the communication unit 156 is a communication standard compliant with the IEEE 802.11 series. In the following description, Wi-Fi® (Wi-Fi® communication) is a communication standard compliant with the IEEE 802.11 series. The communication unit 156 may include hardware functioning as an access point, or may operate as an access point using software for causing the communication unit 156 to function as an access point. In a case where the MFP 151 operates as the master station, the communication unit 156 can maintain P2P wireless connections with a predetermined number or less than the predetermined number of (e.g., three or less) slave station apparatuses in parallel. For example, the P2P wireless connection may be maintained with three slave stations in parallel or it may be maintained with less than three slave stations in parallel. The communication unit 156 can perform wireless communication using a frequency band selected from among 2.4 GHz, 5 GHz, and 6 GHz.

The short-range wireless communication unit 157 is configured to wirelessly connect to an apparatus such as the mobile terminal 101 over a short range, and is connectable to, for example, the short-range wireless communication unit 111 in the mobile terminal 101. Examples of the communication method include NFC, Bluetooth® Classic, Bluetooth® Low Energy, and Wi-Fi Aware®.

The RAM 153 includes an SRAM using a backup power supply. In the RAM 153, data is held by a primary battery (not illustrated) for data backup. Thus, the RAM 153 can store important data such as a program control variable without volatilizing the data. A memory area for storing setting information regarding the MFP 151 and management data on the MFP 151 is also provided in the RAM 153. The RAM 153 is also used as a main memory or a work memory of the CPU 154. The RAM 153 stores a reception buffer for temporarily storing print information received from the mobile terminal 101 and also stores various pieces of information.

The ROM 152 stores fixed data such as control programs to be executed by the CPU 154, a data table, and an embedded OS. In the present embodiment, the control programs stored in the ROM 152 perform software execution control such as scheduling, task switching, and interrupt processing under control of the embedded OS stored in the ROM 152.

The CPU 154 is a system control unit and controls the entire MFP 151.

The print engine 155 performs printing processing for applying a recording agent such as ink to a recording medium such as a sheet to form an image on the recording medium based on the information stored in the RAM 153 or the print information received from the mobile terminal 101. Then, the print engine 155 outputs the printing result. Generally, the amount of data of a print job transmitted from the mobile terminal 101 is large, and thus the print job is desirably communicated using a communication method capable of high-speed communication. Accordingly, the MFP 151 receives the print job via the communication unit 156 that can communicate faster than the short-range wireless communication unit 157. The printing using ink is merely an example, and printing may be performed by an electrophotographic method using toner. Regarding ink, a cartridge MFP to which a cartridge is attached, or an ink supply MFP in which ink is supplied from an ink bottle to an ink tank may be used.

A memory such as an external hard disk drive (HDD) or a Secure Digital (SD) card may be attached as an optional device to the MFP 151. Information stored in the MFP 151 may also be stored in this memory.

The input interface 158 receives input data or an operation instruction from the user operating the operation unit 159 such as physical buttons. The operation unit 159 may be a software keyboard or software buttons displayed on the display unit 161.

In other words, the input interface 158 may receive an input (an operation) from the user through the display unit 161.

The output interface 160 controls the display unit 161 to display data or provide a notification of the state of the MFP 151.

The display unit 161 includes an LED or an LCD. The display unit 161 displays data or provides a notification of the state of the MFP 151.

The USB interface 163 controls a USB connection via a USB cable. More specifically, the USB interface 163 connects to an apparatus such as the mobile terminal 101 or the external access point 131 via a USB cable to perform data communication.

Figure 3:
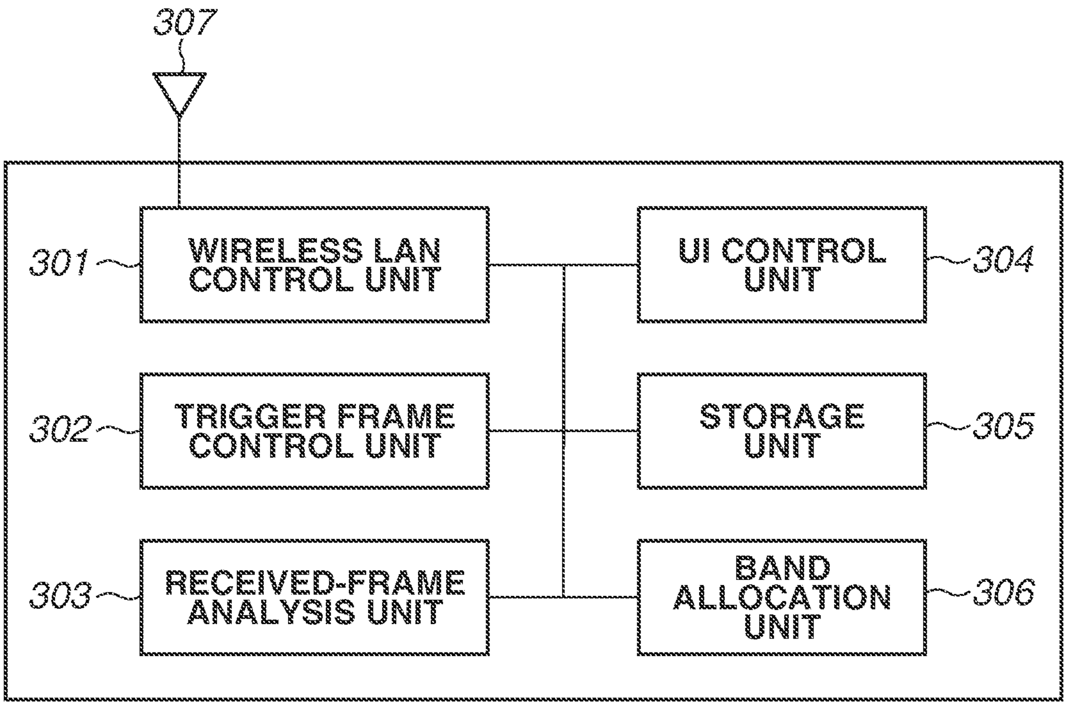
FIG. 3 is a block diagram illustrating an example of a functional configuration of an access point.

FIG. 3 is a block diagram illustrating an example of a functional configuration of the AP 131. For example, the AP 131 includes, as functional components, a wireless LAN control unit 301, a trigger frame control unit 302, a received frame analysis unit 303, a user interface (UI) control unit 304, a storage unit 305, and a band allocation unit 306.

The wireless LAN control unit 301 performs control to transmit and receive a wireless signal to and from another wireless LAN communication apparatus. The wireless LAN control unit 301 can be implemented by, for example, a program for controlling a base band circuit or a radio frequency (RF) circuit and an antenna for WLAN. The wireless LAN control unit 301 performs WLAN communication control according to the IEEE 802.11 standard series and performs wireless communication with a station (STA) compliant with the IEEE 802.11 standard series.

The trigger frame control unit 302 performs control to transmit a trigger frame to a successfully authenticated STA via the wireless LAN control unit 301. Upon receiving a trigger frame, the STA transmits an uplink (UL) frame as a response to the trigger frame. Upon receiving the UL frame via the wireless LAN control unit 301, the AP 131 causes the received frame analysis unit 303 to interpret the content of the received UL frame. For example, if the received UL frame includes access category (AC) information, the received frame analysis unit 303 acquires the information through analysis and identifies which AC corresponds to transmission target data held by the STA having transmitted the UL frame.

Based on the information acquired by the received frame analysis unit 303, the band allocation unit 306 determines the width of the frequency band to be allocated for each STA to transmit data, the center frequency of the frequency band, and the time in which the frequency band is to be allocated. In other words, the band allocation unit 306 determines the frequency range where a wireless resource is to be allocated to each STA, and the timing at which the wireless resource is allocated to each STA. The trigger frame control unit 302 notifies each STA of information indicating the allocation determined by the band allocation unit 306, using a trigger frame and causes the STA to transmit a UL frame based on the allocation.

The UI control unit 304 is implemented, for example, by a program for controlling user interface hardware, such as a touch panel or buttons, which receives an operation performed by a user (not illustrated) of the AP 131. The UI control unit 304 can also have a function of presenting information such as image display information or sound output information to the user. The storage unit 305 is a storage function including a ROM and a RAM that store programs and data for operation of the AP 131.

According to the IEEE 802.11ax standard, a frequency band can be allocated in a size smaller than the conventional 20 MHz band, whereby many terminals can simultaneously use the wireless resource. Such allocation of the wireless resource is performed using orthogonal frequency-division multiple access (OFDMA).

According to the IEEE 802.11ax standard, for example, the 20 MHz bandwidth is divided into nine blocks each including 26 sub-carriers (tones) that do not overlap each other on a frequency axis, thereby allocating the wireless resource to terminals in block units. Each of the blocks as the allocation units is referred to as a "resource unit (RU)", and the size of the RU can be determined depending on the frequency bandwidth and the number of terminals to which the wireless resource is to be allocated. The size of the RU is represented in the unit of the number of tones, and values, for example, 26, 52, 106, 242, 484, 996, and 2×996 can be used. In the 20 MHz bandwidth, values less than or equal to 242 among these values can be used. In a case where the entire 20 MHz bandwidth is allocated to a single terminal, a maximum of 242 tones can be allocated to the terminal. On the other hand, for example, in a case where the 20 MHz bandwidth is simultaneously used by nine terminals, 26 tones are allocated to each of the terminals. In this manner, the frequency band is divided into blocks each having 26 tones, which is the minimum allocation unit, whereby nine terminals can simultaneously communicate using the 20 MHz bandwidth. Similarly, in a case where the 40 MHz, 80 MHz, and 160 MHz frequency bandwidths are used, a maximum of 18, 37, and 74 terminals, respectively, can simultaneously communicate.

Figure 4:
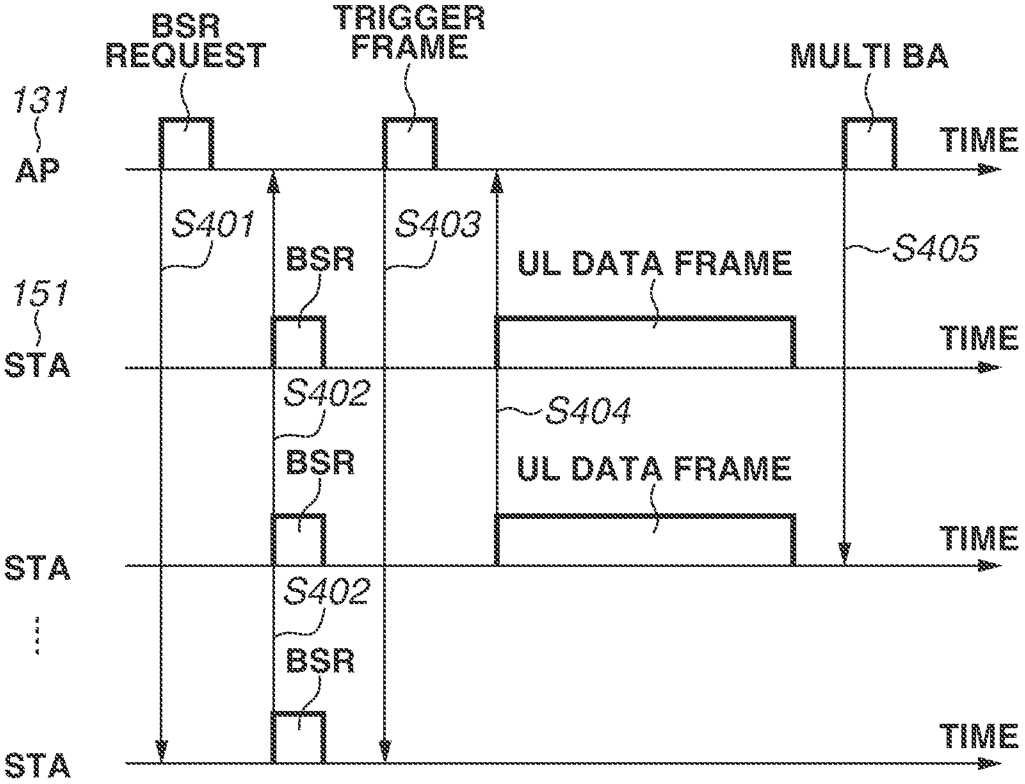
FIG. 4 is a diagram illustrating an example of communication processing according to the present embodiment.
Figure 5:
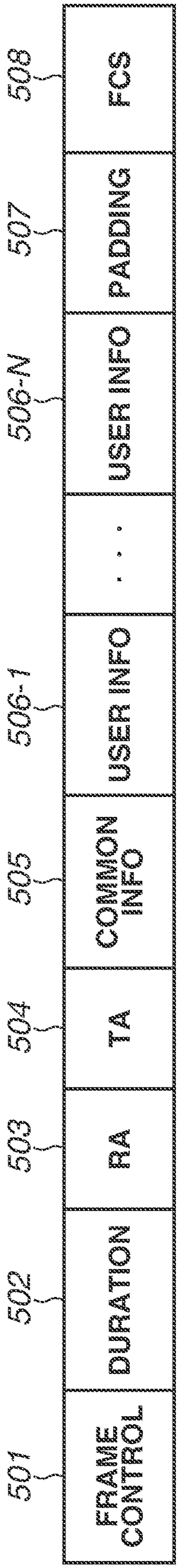
FIG. 5 is a diagram illustrating an example of a frame structure.

Next, a basic procedure for multi-user (MU) communication using a UL will be described with reference to FIG. 4. In step S401, the AP 131 causes the trigger frame control unit 302 to transmit a buffer status report request (a BSR request) to each STA. FIG. 5 illustrates an example of a structure of a frame transmitted at this time. In the example of FIG. 5, the frame includes information fields 501 to 508. Fields of the frame that are unrelated to the description in the present embodiment will not be described below. In the present embodiment, the AP 131, the MFP 151, and the mobile terminal 101 can perform communication according to the IEEE 802.11ax standard.

Referring back to FIG. 4, in step S402, each STA transmits a BSR to the AP 131. In this step, each STA notifies the AP 131 of the presence or absence of data to be transmitted.

Figure 6:
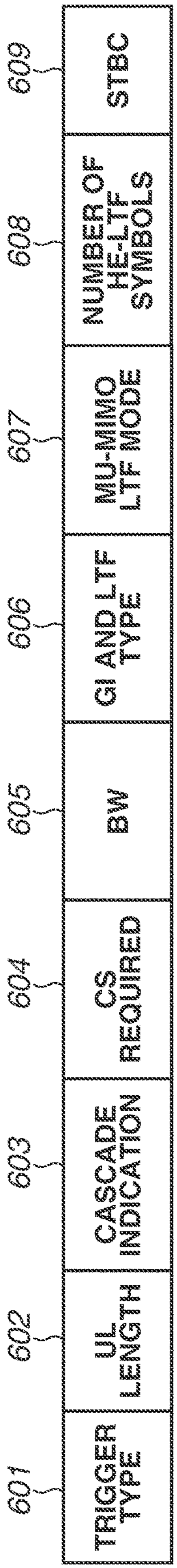
FIG. 6 is a diagram illustrating an example of a frame structure.
Figure 7:
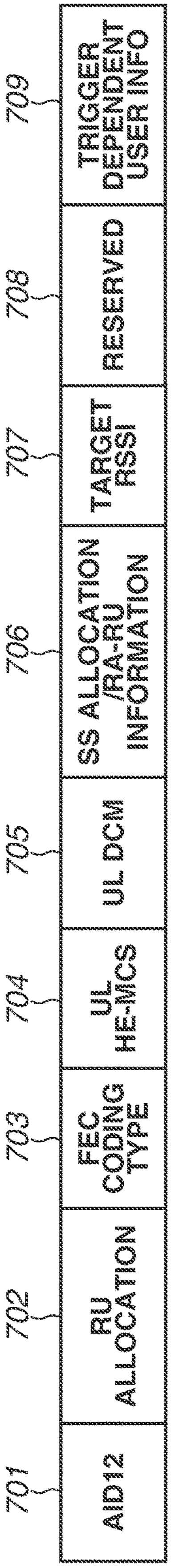
FIG. 7 is a diagram illustrating an example of a frame structure.

In step S403, upon receiving the BSR from each STA, the AP 131 transmits a trigger frame for urging the transmission of UL data, based on the information of the BSR. The frame transmitted at this time also has a format such as that in FIG. 5. In the example of FIG. 5, the field 501 (the "Frame Control" field 501) is, for example, a field that stores a value indicating a trigger frame compliant with the IEEE 802.11ax standard. FIG. 6 illustrates an example of a data structure of the field 505 (the "Common Info" field 505). In the example of FIG. 6, the "Common Info" field 505 includes information sub-fields 601 to 609. The sub-field 601 (the "Trigger Type" sub-field 601) stores "0". The sub-field 602 (the "UL Length" sub-field 602) stores a value corresponding to a communication period common to all STAs. This value indicates the amount of data that can be transmitted by each STA. If the value of the "Trigger Type" sub-field 601 is "0", the fields 506 (the "User Info" fields 506-1 to 506-N) are added to the frame illustrated in FIG. 5. The "User Info" fields 506-1 to 506-N will be described in detail with reference to FIG. 7. The "User Info" fields 506-1 to 506-N each include information sub-fields 701 to 709 as illustrated in FIG. 7. The sub-field 701 (the "AID12" sub-field 701) identifies an STA, and an index value indicated by the sub-field 702 (the "RU Allocation" sub-field 702) identifies an RU and a tone size to be allocated to the STA. The "tone size" refers to a value indicating the width of the frequency band that can be allocated to each STA.

The AP 131 reserves a communication channel in order to transmit the trigger frame. Then, the AP 131 divides the reserved communication channel into a plurality of resource units in a frequency domain and allocates the resource units to terminals.

The description returns to FIG. 6. The sub-field 604 (the "Carrier Sense (CS) Required" sub-field 604) has a length of one bit. The "CS Required" sub-field 604 stores information indicating whether to execute carrier sense. Thus, if the "CS Required" sub-field 604 includes information indicating that carrier sense is to be executed, a communication apparatus having received the trigger frame executes carrier sense. If the "CS Required" sub-field 604 includes information indicating that carrier sense is not to be executed, a communication apparatus having received the trigger frame does not execute carrier sense.

In step S404, upon receiving the trigger frame, each STA transmits a UL data frame in the range of the amount of data specified by the "UL Length" sub-field 602 of the trigger frame. At this time, if the "CS Required" sub-field 604 includes information indicating that carrier sense is to be executed, the STA executes carrier sense and then performs the processing in step S404. If the AP 131 receives a physical layer (PHY) protocol data unit (PPDU) from each STA, then in step S405, the AP 131 transmits a Multi Block Ack (Multi BA) as a reception acknowledgement.

Next, an operation performed by the MFP 151 will be described with reference to FIG. 8. It is assumed that, in the MFP 151, both the infrastructure mode and the P2P mode are enabled/set according to an instruction from the user.

For example, the user enables the infrastructure mode and enables the Wi-Fi Direct® mode using an operation panel of the MFP 151, so that the infrastructure mode and the Wi-Fi Direct® mode are both enabled. The MFP 151 also operates as the master station (e.g., a Wi-Fi Direct® group owner) in the P2P communication. As to the P2P communication, P2P communication in a mode other than the Wi-Fi Direct® mode may be performed. For example, a software AP mode may be executed.

The MFP 151 is assumed to receive the trigger frame from the AP 131 in step S403. In a case where the infrastructure communication and the P2P communication are both enabled, the MFP 151 may refer to a communication channel used in the infrastructure communication. The MFP 151, as the master station, may also construct a network so that the P2P communication is performed using a different communication channel from the communication channel used in the infrastructure communication. The MFP 151, as the master station, may also construct a network so that the P2P communication is performed using the same communication channel. Alternatively, in a case where the infrastructure communication and the P2P communication are both enabled, the MFP 151 may refer to a communication channel used in the infrastructure communication. The MFP 151, as the master station, may construct a network so that the P2P communication is performed using a different communication channel from the communication channel used in the infrastructure communication. In other words, in the example of FIG. 8, while the infrastructure mode and the P2P mode are both enabled, the MFP 151 receives the trigger frame from the external access point 131 in step S403.

In step S801, since the MFP 151 operates as the master station, the MFP 151 transmits a trigger frame. The MFP 151 divides a single communication channel (e.g., a 20 MHz communication channel) into a plurality of resource units and allocates the resource units to STAs including the mobile terminal 101, using a trigger frame such as that described above with reference to FIG. 5. In other words, the "RU Allocation" sub-field 606 of the trigger frame transmitted from the MFP 151 includes information regarding the allocation of the resource units. The number of slave station apparatuses to which the resource units are allocated by the MFP 151 is the maximum number of slave stations that can be maintained in parallel in the direct connection. For example, if the communication unit 156 can maintain P2P wireless connections with a maximum of three slave station apparatuses in parallel, the maximum number of slave station apparatuses to which the resource units are allocated is three. In other words, the maximum number of apparatuses to which the resource units are allocated that is specified in the trigger frame transmitted in step S801 is equal to the maximum number of slave stations that can be maintained in parallel in the direct connection. In step S802, the mobile terminal 101 transmits data to the MFP 151. At this time, the mobile terminal 101 transmits the data using the resource unit allocated by the trigger frame. For example, the mobile terminal 101 transmits a print job in step S802. The mobile terminal 101 may also transmit a request to acquire the status of the MFP 151 or a request to acquire the remaining amount of a consumable product (ink, toner, or sheets) in step S802.

Figure 8:
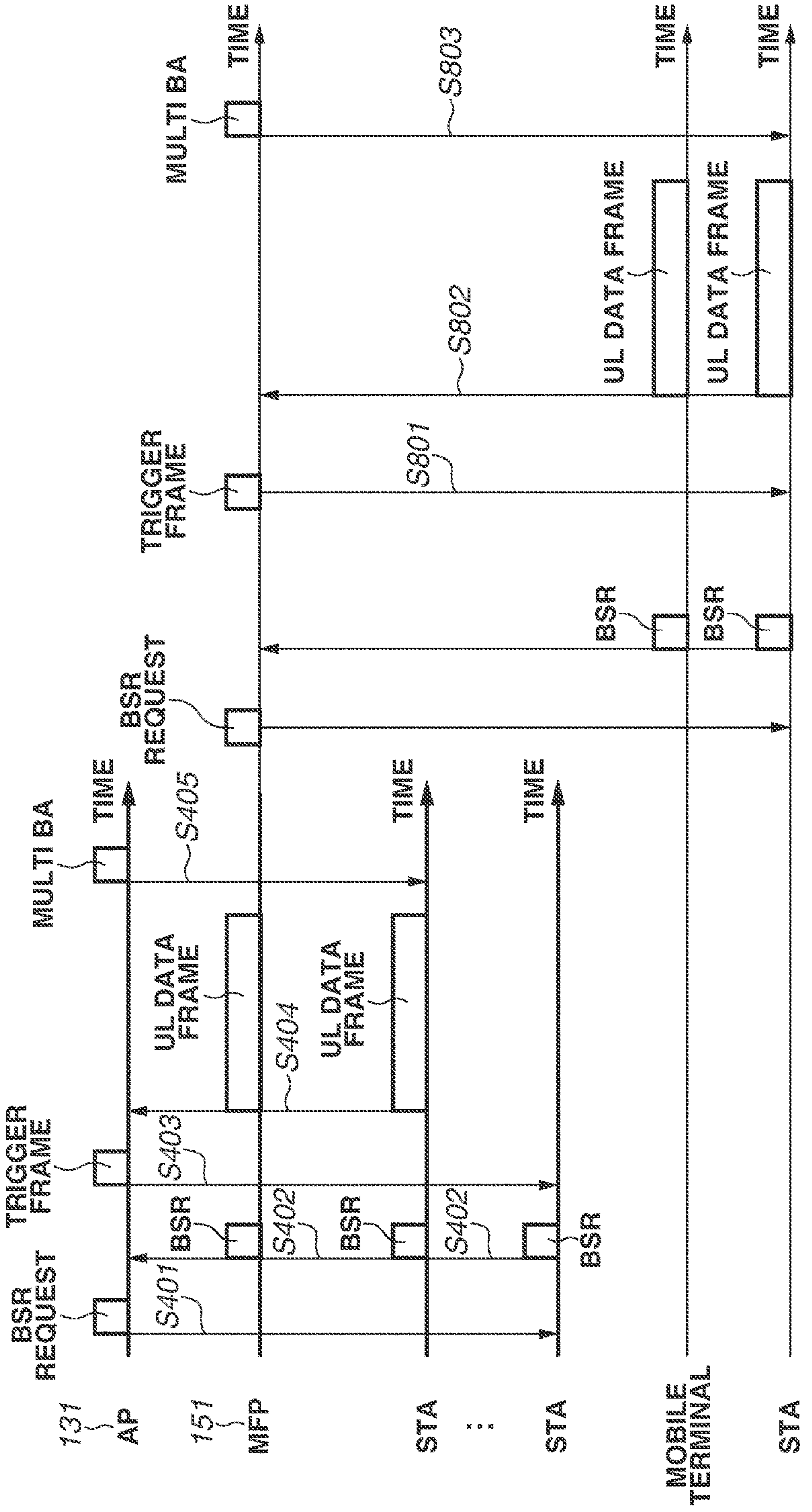
FIG. 8 is a diagram illustrating an example of the communication processing according to the present embodiment.

In FIG. 8, a form has been described in which the MFP 151 connects to the AP 131 according to a user instruction given using the operation panel of the MFP 151 as described above. This method is a method in which the user selects an SSID displayed on the operation panel of the MFP 151 and inputs a password corresponding to the selected SSID to the operation panel. However, an infrastructure connection between the MFP 151 and the AP 131 may be established by another method. This method will now be described with reference to FIG. 9.

In step S901, the MFP 151 enables a setup mode (a wireless setting mode) of the MFP 151 based on a user instruction input to the operation panel. In step S902, the MFP 151 starts, as a result of step S901, an internal AP included in the MFP 151 itself. Even in the state where an infrastructure connection between the MFP 151 and the AP 131 is established before step S901, the setup mode can be enabled in step S901. In this case, the infrastructure connection is disconnected. If the MFP 151 operates as the master station (e.g., the Wi-Fi Direct® group owner) in the P2P communication before step S901, the MFP 151 may stop operating as the master station (e.g., the Wi-Fi Direct® group owner) in the P2P communication based on the instruction in step S901.

In step S903, an instruction from the user is received, and a setup application is started.

Although a form is described in which wireless setting processing on the MFP 151 is performed by a personal computer (PC) in the present embodiment, the wireless setting processing may be performed by a mobile terminal such as a smartphone.

If the user instructs the setup application to perform the wireless setting processing by operating the setup application, the setup application performs direct connection processing with the internal AP. For example, the setup application holds the SSID and the password of the internal AP since the installation of the application. Thus, if the setup application is instructed to perform the wireless setting processing, the setup application reads the SSID and the password of the internal AP and gives an instruction to establish a direct connection between the PC and the MFP 151 using this information.

In step S904, according to this instruction, a direct connection between the PC and the internal AP of the MFP 151 is established.

Next, in step S905, the setup application instructs the MFP 151 to search for APs through the direct connection established in step S904.

In step S907, the MFP 151 receives the instruction in step S905, searches for access points with which the MFP 151 can communicate, and transmits a list of SSIDs as search results.

In step S908, the setup application transmits an SSID selected from the list of SSIDs received in step S907 and a password as AP information. For example, the setup application displays the list of SSIDs received in step S907 and receives the selection of an SSID from the user. Then, the setup application displays a screen for inputting a password corresponding to the selected SSID and transmits the input password and the selected SSID as the AP information.

If the PC is connected to the AP 131 immediately before step S904 and the SSID of the AP 131 is included in the list of SSIDs transmitted in step S907, the setup application automatically transmits the SSID and the password of the AP 131 in step S905. That is, the PC transmits the AP information without displaying the list of SSIDs and receiving the selection of an SSID from the user. If, in contrast, the PC is connected to the AP 131 immediately before step S904 and the SSID of the AP 131 is not included in the list of SSIDs transmitted in step S907, the setup application may display the list of SSIDs received in step S907 and receive the selection of an SSID from the user.

If the MFP 151 receives the AP information transmitted in step S908, the MFP 151 stops the internal AP and establishes an infrastructure connection using the AP information transmitted in step S908.

Figure 9:
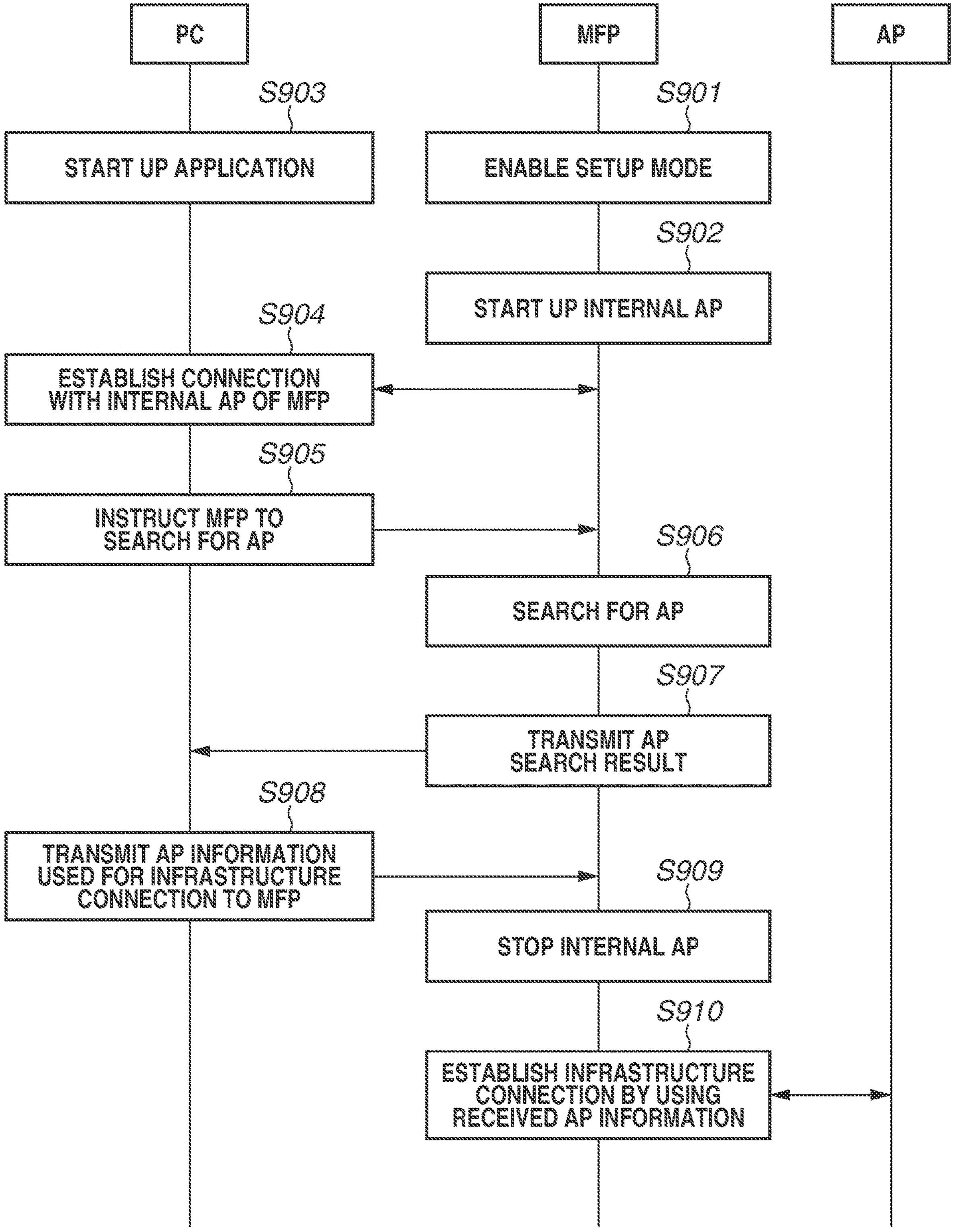
FIG. 9 is a diagram illustrating an example of wireless setting processing according to the present embodiment.

Then, after the processing in FIG. 9 ends, both the infrastructure mode and the Wi-Fi Direct® mode may be enabled by the user enabling the Wi-Fi Direct® mode using the operation panel of the MFP 151, and the processing in FIG. 8 may be performed. If the MFP 151 stops operating as the master station (e.g., the Wi-Fi Direct® group owner) in the P2P communication based on step S901 as described above, the MFP 151 resumes the operation as the master station (e.g., the Wi-Fi Direct® group owner) in the P2P communication based on the processing of step S910. In this case, the MFP 151 may resume the operation as the master station in the P2P communication using the same channel as that of the infrastructure connection established in step S910, or may resume the operation as the master station in the P2P communication using a different channel from that of the infrastructure connection established in step S910.

Figure 10:
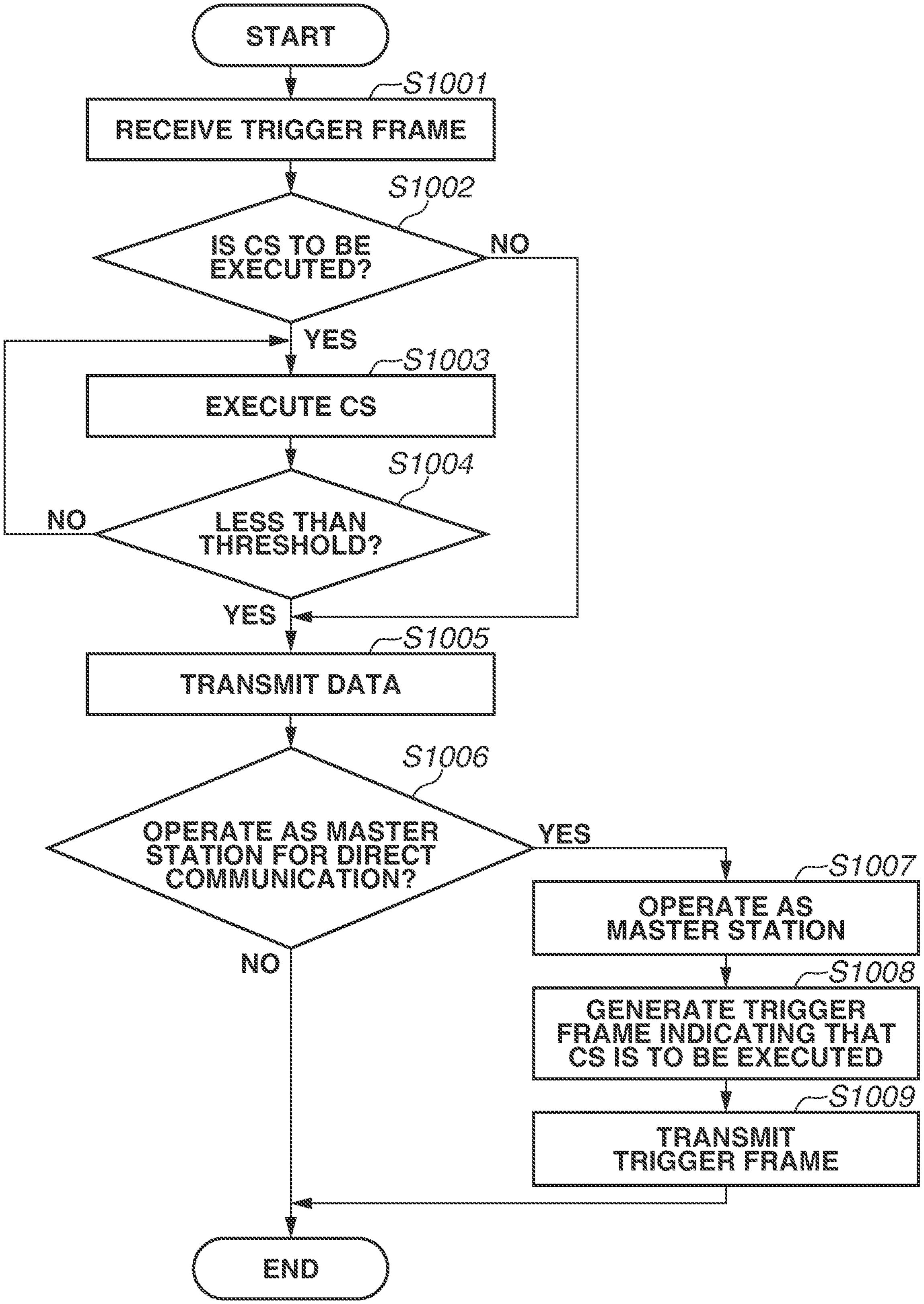
FIG. 10 is a flowchart illustrating processing performed by the image forming apparatus.

Next, processing performed by the MFP 151 will be described with reference to a flowchart in FIG. 10. The flowchart according to the present embodiment is implemented by the CPU 154 reading a program related to the processing in the flowchart from the ROM 152 and executing the program. The flowchart in FIG. 10 is executed in the situation where an infrastructure connection is established by the processing in FIG. 9, and then, both the infrastructure mode and the Wi-Fi Direct® mode are enabled by the user enabling the Wi-Fi Direct® mode using the operation panel of the MFP 151.

In step S1001, the CPU 154 receives from the AP 131 the trigger frame described above in step S403 in FIG. 4. In step S1002, the CPU 154 determines whether to execute carrier sense. The CPU 154 implements the processing in step S1002 by referring to the information in the "CS Required" sub-field 604 in FIG. 6. If the CPU 154 determines not to execute carrier sense (NO in step S1002), then in step S1005, the CPU 154 transmits transmission target data to a destination apparatus via the AP 131 without executing carrier sense.

If the CPU 154 determines to execute carrier sense (YES in step S1002), then in step S1003, the CPU 154 executes carrier sense. In step S1004, the CPU 154 senses the energy (the power) of radio waves generated in the communication channel used in the communication with the AP 131. Then, the CPU 154 determines whether the sensed energy is greater than or equal to a threshold. If the CPU 154 determines that the energy of the radio waves generated in the communication channel is greater than or equal to the threshold (NO in step S1004), the CPU 154 determines that the CPU 154 is unable to transmit data to the AP 131. Then, the processing returns to step S1003. Alternatively, if the CPU 154 determines that the energy of the radio waves generated in the communication channel is greater than or equal to the threshold (NO in step S1004), the CPU 154 may skip the processing of step S1005 and proceed to step S1006.

If the CPU 154 determines that the power generated in the communication channel is less than the threshold (YES in step S1004), the CPU 154 determines that the CPU 154 is able to transmit data to the AP 131. In step S1005, the CPU 154 transmits the transmission target data to the destination apparatus via the AP 131. For example, scan data obtained by the MFP 151 reading a document, or status information regarding the MFP 151 is transmitted in step S1005. The status information regarding the MFP 151 may be error information regarding the MFP 151, information regarding the remaining amount of ink (or toner), or information regarding the remaining number of sheets. Alternatively, the status information may be the combination of the error information, the information regarding the remaining amount of ink (or toner), and the information regarding the remaining number of sheets. The CPU 154 transmits the transmission target data using the resource unit allocated to the MFP 151 by the "RU Allocation" sub-field 702.

In step S1006, the CPU 154 determines whether the MFP 151 is to operate as the master station for direct communication. For example, if the user instructs the MFP 151 to enable Wi-Fi Direct® and the MFP 151 is determined to operate as the group owner as a result of a negotiation (an intent value comparison) with a communication partner apparatus in the Wi-Fi Direct® mode, the CPU 154 determines that the MFP 151 is to operate as the master station for direct communication (YES in step S1006). Also, if the user instructs the MFP 151 to enable the software AP mode, the CPU 154 determines that the MFP 151 is to operate as the master station for direct communication (YES in step S1006).

In step S1007, the CPU 154 causes the MFP 151 to operate as the master station for direct communication. In step S1008, the CPU 154 generates a trigger frame including information indicating that CS is to be executed. In step S1009, the CPU 154 transmits the trigger frame to a slave station (e.g., the mobile terminal 101) connected to the CPU 154. At this time, the MFP 151 sets the information indicating that carrier sense is to be executed in the "CS Required" sub-field 604 in FIG. 6, and transmits the trigger frame illustrated in FIG. 5. The CPU 154 also allocates the resource unit to be used by the apparatus (e.g., the mobile terminal 101) connected to the MFP 151, using the "RU Allocation" sub-field 702. In this case, the mobile terminal 101 executes carrier sense and then transmits data to the MFP 151 using the allocated resource unit. For example, the mobile terminal 101 transmits print data to the MFP 151 using the allocated resource unit.

While FIG. 10 illustrates the procedure in which the processing in steps S1006 to S1009 is performed after the processing in steps S1001 to S1005, the CPU 154 may perform the processing in reverse order. In other words, after the processing in steps S1006 to S1008 is performed first, the processing in steps S1001 to S1005 may be performed. Alternatively, the processing in steps S1001 to S1005 and the processing in steps S1006 to S1009 may be performed in parallel.

If the infrastructure communication is disabled and the direct communication is enabled, the CPU 154 may perform only the processing in steps S1006 to S1009.

The MFP 151 may perform the processing in step S1008 based on the information indicating whether to execute carrier sense that is included in the trigger frame transmitted from the AP 131. In other words, if the CPU 154 determines to execute CS in step S1002, then in step S1008, the MFP 151 generates a trigger frame including information indicating that CS is to be executed. If the CPU 154 determines not to execute CS in step S1002, then in step S1008, the MFP 151 generates a trigger frame including information indicating that CS is not to be executed.

According to the present embodiment, if the MFP 151 is instructed to execute carrier sense by the AP 131, the MFP 151 transmits a trigger frame indicating that carrier sense is to be executed, to a slave station connected to the MFP 151. This enables slave stations including the mobile terminal 101 to execute carrier sense and then transmit data such as print data, thereby making it possible to appropriately transmit data.

In the above embodiment, a form has been described in which, if the MFP 151 is instructed to enable the setup mode, the MFP 151 starts the internal AP and receives AP information. Alternatively, another form may be employed. For example, if the MFP 151 is instructed to enable the setup mode, the MFP 151 may establish a connection with a PC or a smartphone near the MFP 151 by using Bluetooth®. Then, steps S904 to S908 may be performed through the Bluetooth® connection. Alternatively, not only Bluetooth® but also another communication method may be employed.

According to the present disclosure, it is possible to provide convenient wireless communication.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2023-044872, filed Mar. 22, 2023, which is hereby incorporated by reference herein in its entirety.

What is claimed is:

1. A communication apparatus configured to perform first wireless communication via an external access point and second wireless communication not via an external access point, the communication apparatus comprising:

at least one processor; and one or more memories storing instructions that, when executed by the at least one processor, cause the communication apparatus to:

receive, while a wireless setting mode is enabled, information regarding an external access point from a terminal apparatus through a direct connection established between the communication apparatus and the terminal apparatus not via an external access point outside the communication apparatus;

based on the received information regarding the external access point, connect to the external access point and receive a first trigger frame compliant with the Institute of Electrical and Electronics Engineers (IEEE) 802.11 standard from the external access point, the first trigger frame including information regarding execution of carrier sense;

based on the receipt of the first trigger frame which includes information indicating that the carrier sense is to be executed, execute the carrier sense and then transmit data; and based on the receipt of the first trigger frame which includes the information indicating that the carrier sense is to be executed, transmit, while the communication apparatus operates as a master station that is configured to determine a communication channel to be used in the second wireless communication, a second trigger frame compliant with the IEEE 802.11 standard to a slave station apparatus connected to the master station, the second trigger frame including information indicating that the carrier sense is to be executed.

2. The communication apparatus according to claim 1, further comprising a printer which performs printing processing on a sheet based on print data received from the slave station apparatus.

3. The communication apparatus according to claim 1, further comprising a scanner which scans documents and acquires scan data, wherein the instructions, when executed by the at least one processor, cause the communication apparatus to, after the carrier sense is executed and based on a determination that sensed energy is less than a threshold, transmit the scan data by using one or more resource units allocated to the communication apparatus by the first trigger frame.

4. The communication apparatus according to claim 1, wherein the instructions, when executed by the at least one processor, cause the communication apparatus to, after the carrier sense is executed and based on a determination that sensed energy is less than a threshold, transmit status information indicating a state of the communication apparatus by using one or more resource units allocated to the communication apparatus by the first trigger frame.

5. The communication apparatus according to claim 1, wherein the second trigger frame includes the information indicating that the carrier sense is to be executed and information regarding allocation of one or more resource units.

6. The communication apparatus according to claim 1, wherein a maximum number of apparatuses to which resource units are allocated that is specified in the second trigger frame is equal to a maximum number of slave station apparatuses that are maintainable in parallel in the second wireless communication.

7. The communication apparatus according to claim 1, wherein the communication apparatus operating as the master station maintains wireless connections for the second wireless communication with a predetermined number or less than the predetermined number of slave station apparatuses in parallel.

8. The communication apparatus according to claim 1, wherein the first wireless communication and the second wireless communication are performed using the same communication channel.

9. The communication apparatus according to claim 1, wherein the first wireless communication and the second wireless communication are performed using different communication channels.

10. The communication apparatus according to claim 1, wherein the communication apparatus performs wireless communication using a frequency band selected from among frequency bands of 2.4 GHz, 5 GHz, and 6 GHz.

11. A method for controlling a communication apparatus, the method comprising:

while a wireless setting mode is enabled, receiving information regarding an external access point from a terminal apparatus through a direct connection established between the communication apparatus and the terminal apparatus not via an external access point outside the communication apparatus;

based on the received information regarding the external access point, connecting to the external access point and receiving a first trigger frame compliant with the Institute of Electrical and Electronics Engineers (IEEE) 802.11 standard from the external access point, the first trigger frame including information regarding execution of carrier sense;

based on the receipt of the first trigger frame which includes information indicating that the carrier sense is to be executed, executing the carrier sense and then transmitting data; and based on the receipt of the first trigger frame which includes the information indicating that the carrier sense is to be executed, transmitting, while the communication apparatus operates as a master station that is configured to determine a communication channel to be used in second wireless communication in which wireless communication is performed not via an external access point, a second trigger frame compliant with the IEEE 802.11 standard to a slave station apparatus connected to the master station, the second trigger frame including information indicating that the carrier sense is to be executed.

12. A non-transitory computer-readable storage medium storing one or more programs for executing a method for controlling a communication apparatus, the method comprising:

while a wireless setting mode is enabled, receiving information regarding an external access point from a terminal apparatus through a direct connection established between the communication apparatus and the terminal apparatus not via an external access point outside the communication apparatus;

based on the received information regarding the external access point, connecting to the external access point and receiving a first trigger frame compliant with the Institute of Electrical and Electronics Engineers (IEEE) 802.11 standard from the external access point, the first trigger frame including information regarding execution of carrier sense;

based on the receipt of the first trigger frame which includes information indicating that the carrier sense is to be executed, executing the carrier sense and then transmitting data; and based on the receipt of the first trigger frame which includes the information indicating that the carrier sense is to be executed, transmitting, while the communication apparatus operates as a master station that is configured to determine a communication channel to be used in second wireless communication in which wireless communication is performed not via an external access point, a second trigger frame compliant with the IEEE 802.11 standard to a slave station apparatus connected to the master station, the second trigger frame including information indicating that the carrier sense is to be executed.

* * * * *